W. ZACHARIAS.
PROCESS OF EXTRACTING METAL VALUES.
APPLICATION FILED MAR. 25, 1915.
1,304,842.
Patented May 27, 1919.
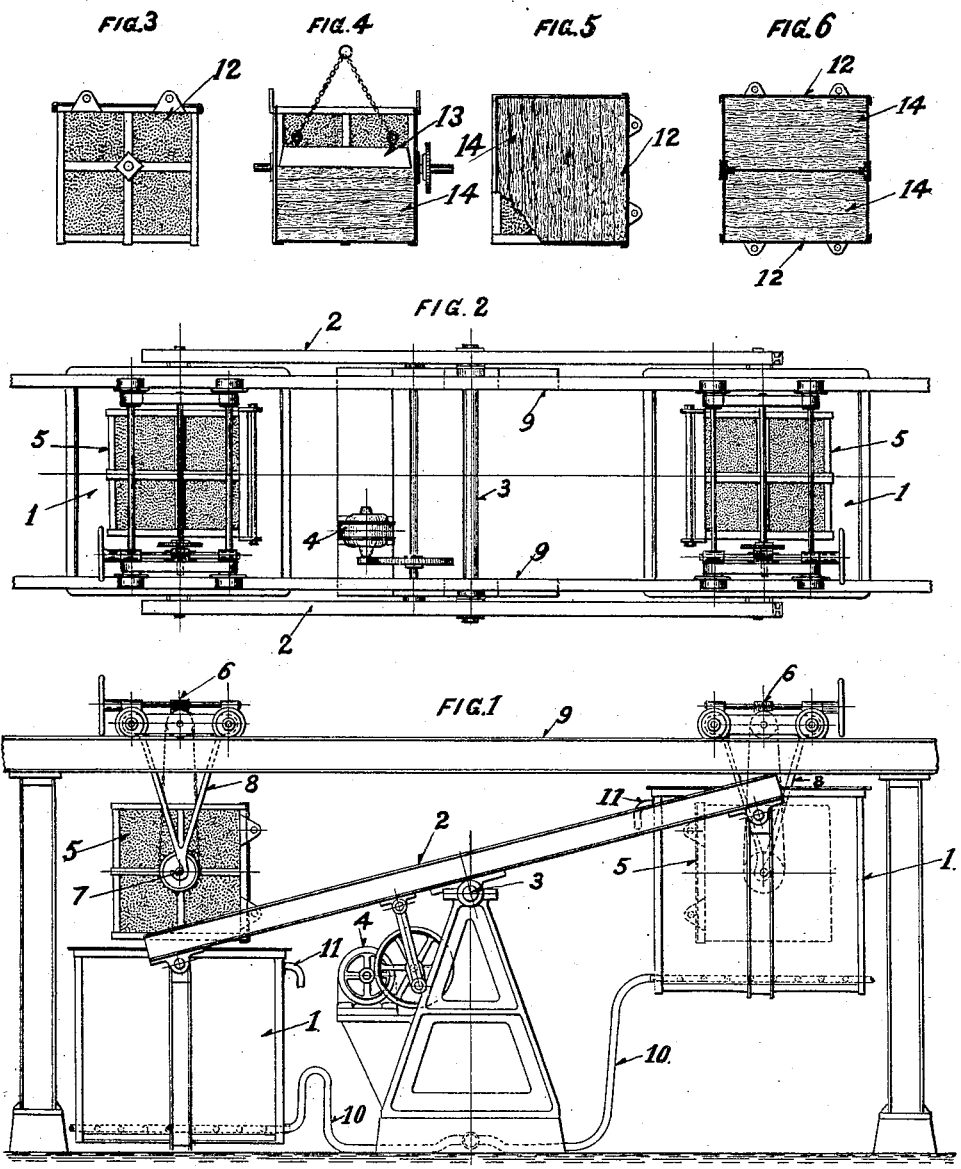
WITNESSES:
INVENTOR

UNITED STATES PATENT OFFICE.

WALTHER ZACHARIAS, OF NEVILLE ISLAND, PENNSYLVANIA.

PROCESS OF EXTRACTING METAL VALUES.

1,304,842.      Specification of Letters Patent.      Patented May 27, 1919.

Application filed March 25, 1915. Serial No. 16,959.

*To all whom it may concern:*

Be it known that I, WALTHER ZACHARIAS, a subject of the German Emperor, residing on Neville Island, in the county of Allegheny and State of Pennsylvania, have invented new and useful Improvements in Processes of Extracting Metal Values, of which the following is a specification.

It is well known that certain metals, when subjected to the alternating action of oxygen or oxidizing agents and alkaline solutions, form salts which are either marketable in themselves or may be easily converted into marketable metal products. From a commercial standpoint tin stands in the foreground among these metals, and numerous methods and apparatus have been devised to attain the extraction of this metal from tin bearing material.

Among these, especially for recovering tin from tin scrap, are revolving drums, with hollow spindles and consisting of perforated plates which admit the solutions and also are intended for the admission of the oxygen of the atmosphere; further, perforated cases or baskets suitably suspended on beams or chains for dipping and removing the metal bearing charges into and from the solutions, are in use for this purpose, and also other devices too manifold to enumerate especially.

All these devices have more or less the disadvantage that the charges are not equally subjected to the action of the chemical agents employed, whereby certain drawbacks and losses both in time, labor and material become unavoidable. For example, in the case that revolving drums built up from single compartments, arranged in an annular space are employed filled with tin scrap which is a very bulky material, there is an impossibility of packing the charge tight enough, so that during the revolutions of the drum, no shifting of the charge takes place, which will result in direct losses of metal, which together with the dirt and even mechanically removed and chemically precipitated tin will gather at the bottom of the tanks, there forming a mud or slime, which will be a great hindrance to the continuous operation of the apparatus, besides necessitating considerable costs for labor to remove said mud. This mud consisting partly, as aforesaid, if the solvent be sodium-hydrate, of tin, iron, iron oxid, sand, lead, sodium stannate- and plumbate, sodium hydroxid- and carbonate, organic substances, and so on, is relatively so poor in tin, that so far, hardly any economical process for the recovery of the tin contents exists, though the absolute loss in tin values is high. Besides the revolving of the drum, produces such a scum, that practically the whole process would come to a standstill from lack of oxidation, which to avoid other additional arrangements, have to be used largely increasing the attention and labor necessary.

The alternating dipping and removing of the material into and out of tanks filled with the active solutions causes the great drawback that the different parts of the charges are unequally submitted to the action of the reagents, the lowermost parts remaining too long in the solutions, the uppermost being too long exposed to the atmospheric oxygen, and vice-versa. Besides these aforementioned drawbacks another patent requires a counterbalancing of such charges which has been proven to be utterly impracticable due to the ever varying nature of the scrap, the difference between the charges of containers of the same containers being according to common experience such that to counterbalance them a considerable excess of power is expended, which greatly increases the cost of the process. Both methods are also suffering from the additional drawback that the material has to be packed comparatively loosely to admit of a free circulation of the liquids and oxygen-bearing reagents, thereby necessitating an enormous increase of the size and number of units of the apparatus, to allow either process to be worked economically.

All these drawbacks are avoided, if instead of making the charge the movable element in the process, the solution is made movable. This I accomplish by mounting the tanks filled with the solvents on some support moving about a fulcrum, or some similar arrangement, in counterbalanced relation, or otherwise arranging my solvents in counterbalanced relation, that practical experience and the practical requirements of the case might suggest.

In the accompanying drawings, Figure 1 is an elevation, Fig. 2 a plan view of an arrangement to carry out my said invention, while Figs. 3, 4, 5 and 6 are elevations of containers in different positions and with different arrangements and features for packing the scrap, same numerals referring to same parts throughout the several views.

In all these views, 1 represents tanks filled with solvents in counterbalanced relation on a framework 2 movable around an axis 3, actuated by a motor 4 or its equivalent and the necessary transmissions. 5 represents baskets with perforated sides for holding the scrap which by an arrangement shown at 6 (worm gear) or its equivalent, may be reversed on an axis 7, suspended in a frame 8, supported by an overhead frame work 9. 10 are flexible means for artificially varying the temperatures of the solutions in the tanks 1 and 11 are means of overflow for regulating the level and thereby the weights of the liquid in tanks 1. Fig. 3 shows a basket after having been filled with compressed scrap and which is closed by a cover 12. In Fig. 4 a basket is shown, in which the scrap is being suitably compressed by a weight 13 forming horizontal layers 14, which Fig. 5 shows turned to a vertical position, cover 12 being also in a vertical position, while Fig. 6 shows a basket divided in two compartments with two covers 12 for compression from two opposite sides.

From the accompanying drawing representing one kind of possible apparatus, it will be easily understood that the tanks with liquids can be very evenly balanced, whereby practically the expenditure of power for the moving of the same is reduced to a minimum, hardly exceeding the amount of power necessary to overcome the unavoidable friction which may be also lessened by the use of roller- or ball bearings, or some similar device. Such equilibrium between the tanks in question may be accomplished or maintained by some automatic means, such as overflows and other means for regulating the level of the liquid, or if necessary by automatic feeding devices, or both combined.

Furthermore, my method allows a compression of the scrap, hitherto not practised in these processes, thereby, allowing a great reduction of the size and the number of units of the apparatus. After compression from one or two opposite sides, the scrap will be in parallel layers. This will also allow of placing these parallel layers in the same direction in which the solvents are moved and in which the scrap becomes submerged therein. If the compression has been made in a vertical direction, the layers, due to the nature of the scrap, will be horizontal, and this will allow to turn the scrap which might be in containers properly provided with a perforated cover at the most suitable angle, say about 90 degrees, thereby, placing all these parallel layers in a nearly vertical position, suitable to the relative up and down movement of treated and treating material, as for instance illustrated in the drawing. To insure an absolute equal treatment of all parts of the scrap both as to intensity and time, I provide means for turning the material upside down or through any desired angle as often and at such intervals as the amount of tin requires until it is practically removed. For instance, a charge of 20,000 lbs. in each of two containers, may be turned over every 30 minutes, at an angle of 180° as long as there is any tin left on the scrap. Of course, this period of 30 minutes is absolutely arbitrary and may hold good in a certain instance if all other conditions are favorable. It might be even found, in certain instances, desirable to resort to constant revolution of the scrap, all this depending on the actual condition under which the process has to be carried out, and it may be perhaps advisable to turn the charge over only once during the whole process.

It is of course understood that this process may be executed at ordinary, reduced or elevated temperatures, in which case means for heating or cooling the solution or the scrap must be provided in any manner well known to those skilled in the art to which this process appertains.

The tight packing of the scrap (it is very easy to compress say 20,000 lbs. into a cube of 8x8x8 ft., or into a cylinder of 10 ft. high and 8 ft. in diameter) which this process allows, has also the further advantage to reduce the formation of mud or slime in the tanks to a minimum, the charge being prevented from shifting. There will be only a slight formation of scum, the liquid dropping from the scrap, destroying the scum. The resulting solutions have to be further treated to produce marketable metal products by well known methods, if such solutions are not marketable without any further treatment. It is understood that the source of oxygen is not necessarily the atmosphere, but that the oxygen may be supplied by any other chemicals, the apparatus for the application of these oxidizing mixtures might be similar to those for the aforesaid solvents. It is also understood that the term "solvent" might mean a liquid based on an alkaline substance or may be based on an acid substance, or on a salt of an acid, or alkali in which neither the acid nor the alkali is saturated with the metal, and it is further understood that such solvents of an alkaline or acid character may be used alternately.

But I do not limit myself to the use of any material mentioned in this specification, nor to any size or shape of the apparatus described herein and illustrated in the accompanying drawing, nor to any temperature conditions or chemical quality or concentration of the reagents, but desire to arrange all these features according to the requirements of any special case in hand.

Having thus fully described these, my improvements, and inventions, what I claim and desire to secure by Letters Patent, is:

1. In apparatus of the character described, a plurality of containers for solvents, means for supporting the containers and the contained solvents in a substantially balanced state, means for suspending material to be treated, and means for moving the contained solvents into and out of contact with said material.

2. In apparatus of the character described, a plurality of containers for solvents, means for supporting the containers and the contained solvents in a substantially balanced state, means for suspending material to be treated, means for moving the contained solvents into and out of contact with said material, and means for turning the suspended material while being treated.

3. The method herein described which consists in suspending a plurality of masses of material to be treated, maintaining a plurality of bodies of solvents in counterbalanced relation and alternately moving the solvents into and out of contact with the masses of material, and turning a mass of material while in contact with the solvent.

4. The method herein described which consists in suspending a mass of material to be treated, maintaining a plurality of bodies of solvents in counterbalanced relation and then moving a solvent body into and out of contact with the material being treated.

5. The method herein described which consists in arranging the material to be treated in substantially parallel layers and suspending the same, alternately subjecting the material to the action of solvents and oxidizing agents and turning the material while treating the same.

6. The method herein described which consists in arranging the material to be treated in substantially parallel layers, and then moving a solvent into and out of contact with the material in a plane substantially parallel with the planes of the layers of material, whereby the solvent may readily enter and leave the interstices between the layers of the material being treated.

7. The method herein described which consists in arranging the material to be treated in substantially parallel layers and suspending the same, moving a solvent into contact with the material and while in contact with the solvent turning the material, and then moving the solvent out of contact with the material.

In testimony whereof I have hereunto set my hand in the presence of the witnesses named below.

WALTHER ZACHARIAS.

Witnesses:
CHARLES ZABEL,
JOHANNES BRAUN.

Copies of this patent may be obtained for five cents each, by addressing the "Commissioner of Patents, Washington, D. C."